(No Model.)
S. P. IDDINGS.
FENCE POST.
No. 528,674.  Patented Nov. 6, 1894.
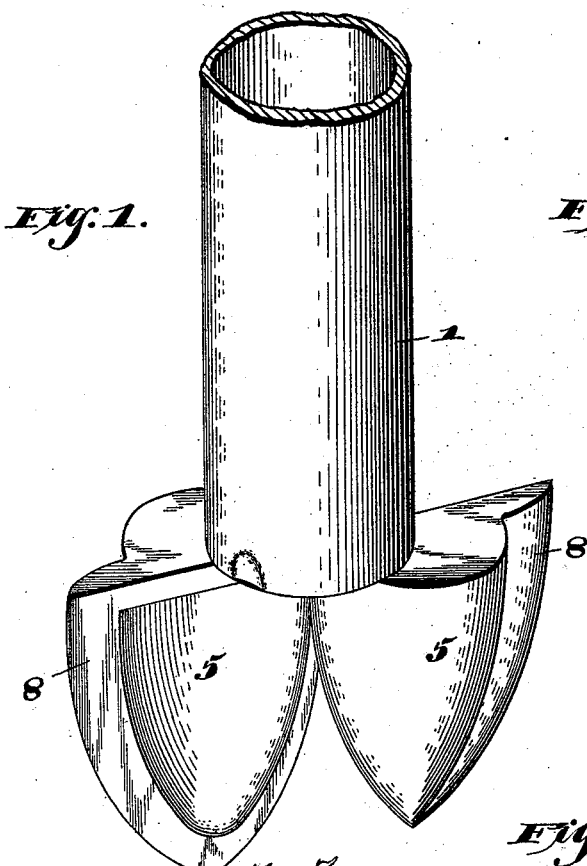
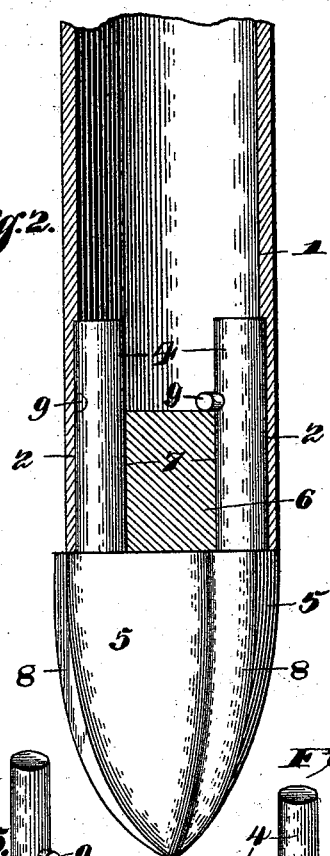
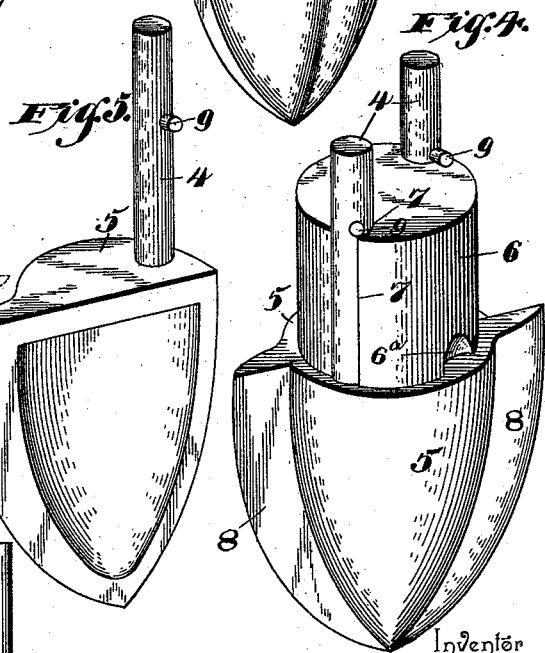
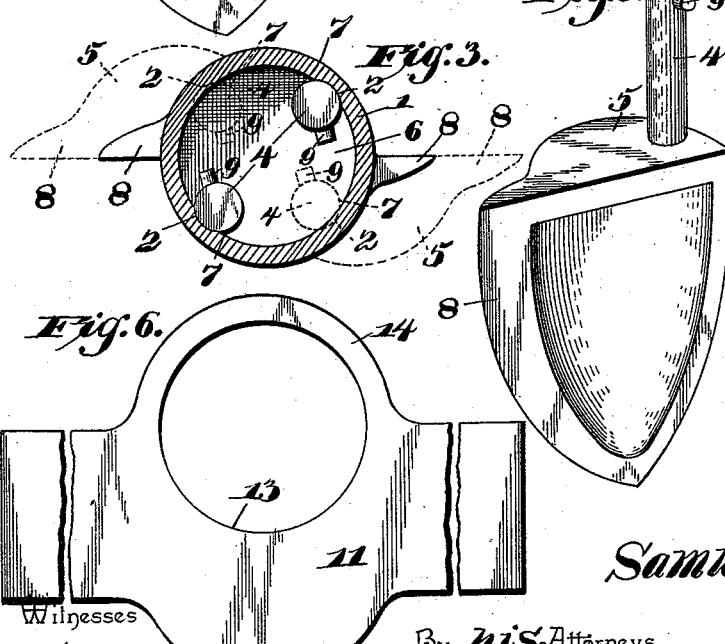
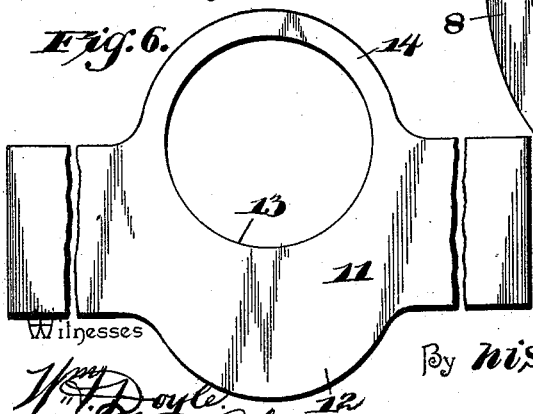
Inventor
Samuel P. Iddings.
By his Attorneys.
C. A. Snow & Co.
Witnesses

UNITED STATES PATENT OFFICE.

SAMUEL P. IDDINGS, OF TROY, OHIO, ASSIGNOR OF ONE-HALF TO J. H. IDDINGS, OF SAME PLACE.

FENCE-POST.

SPECIFICATION forming part of Letters Patent No. 528,674, dated November 6, 1894.

Application filed March 20, 1894. Serial No. 504,419. (No model.)

*To all whom it may concern:*

Be it known that I, SAMUEL P. IDDINGS, a citizen of the United States, residing at Troy, in the county of Miami and State of Ohio, have invented a new and useful Fence-Post, of which the following is a specification.

The invention relates to improvements in fence posts.

The object of the present invention is to improve the construction of fence posts, and to provide one adapted to be readily driven into the ground, and which is capable of having its lower end spread after being driven into the ground to prevent it from being accidentally withdrawn and to afford a firm and secure anchorage.

The invention consists in the construction and novel combination and arrangement of parts hereinafter fully described, illustrated in the accompanying drawings, and pointed out in the claims hereto appended.

In the drawings: Figure 1 is a perspective view of the lower end of a post constructed in accordance with this invention. Fig. 2 is a longitudinal sectional view of the same. Fig. 3 is a horizontal sectional view. Fig. 4 is a detail perspective view of the point of the post and the actuating block. Fig. 5 is a similar view of one of the members or sections of the point. Fig. 6 is a plan view of the horizontal anchor or brace.

Like numerals of reference indicate corresponding parts in all the figures of the drawings.

1 designates a tubular or hollow cylindrical post, provided at its bottom, on its interior, with a pair of oppositely-disposed vertically-arranged curved grooves 2, which receive vertically-disposed journals 4, of eccentrically pivoted segmental sections 5, of a spear point; and interposed between the journals or stems 4 is a cylindrical block 6, which is provided at opposite points with vertical grooves 7. The semi-spear shaped sections 5 have flat opposed faces and are preferably hollowed out between their edges, and they are provided at opposite points with vertically-disposed curved flanges 8. The stems or journals 4, are provided, at the top of the block 6, with fastening devices 9, such as a bolt or pin, to prevent the journals or stems from being drawn out of the receiving grooves, should it be desirable to withdraw the fence post from the ground.

After the fence post has been driven into the ground, which is easy owing to the spear-point, it is adapted to be slightly rotated, whereby the flanges 8, which will be held by the earth, will cause the journals or stems 4 to turn to throw the sections 5 of the spear-point outward to increase the size of the point to afford a firm and secure anchorage for the fence post. By turning the fence post in the opposite direction the spear-sections are brought back to their initial positions. The block 6 is provided at its lower edge at opposite points with notches 6$^a$, into which the post is sunk to secure the block 6 to it. The fence post may then be pulled out of the ground without liability of leaving the point in the post-hole.

The fence post is braced at the top of the ground by a horizontal anchor 11, consisting of a flat bar provided at one side with a segmental protuberance 12, and having at the opposite side a curved recess 13, opposite which is arranged a curved connecting piece 14, which forms, with the recess, a circular opening for the reception of the post. This horizontal anchor is slipped over the post after the latter has been driven into the ground and it forms a firm and secure brace.

It will be seen that the fence post is simple and comparatively inexpensive in construction, that it is adapted to be readily driven into the ground, and that it is capable of having its point spread after being driven into the ground to afford a firm and secure anchorage. It will also be seen that the point may be contracted when it is desired to withdraw the fence post from the ground.

Changes in the form, proportion, and the minor details of construction may be resorted to without departing from the principle or sacrificing any of the advantages of this invention.

What I claim is—

1. The combination of a fence post, and a spear point arranged at the lower end of the post and forming an entering point for the same, and composed of two separable sections adapted to be spread to form an anchor and provided with vertical journals arranged in suitable bearings of the post, substantially as described.

2. A post provided at its lower end with a spear-point composed of two separately-journaled sections having opposite webs or flanges and adapted to turn, whereby they are spread after the post is inserted in the ground, substantially as described.

3. The combination with a tubular fence post provided at its bottom, on its interior, with shallow vertical grooves, a cylindrical operating block arranged in the lower end of the post and provided with opposite grooves, and a point composed of separate sections provided with vertical journals arranged in said grooves and bulging beyond the sides of the block, substantially as and for the purpose described.

4. The combination with a fence post, of a spear point arranged at the lower end of the same and forming an entering point for the post and comprising two eccentrically pivoted segmental sections, capable of separation by the rotation of the post, whereby an anchor is formed at the lower end of the latter substantially as described.

5. The combination with a fence post, of two semi-spear shaped sections pivotally mounted at the lower end of the post, and fitting together to form an entering point for the post, and capable of separation, after the post has been inserted in the ground, to provide an anchor, substantially as described.

In testimony that I claim the foregoing as my own I have hereto affixed my signature in the presence of two witnesses.

SAMUEL P. IDDINGS.

Witnesses:
AUBREY COPPOCH,
J. H. HENMAN.